Patented Feb. 22, 1949

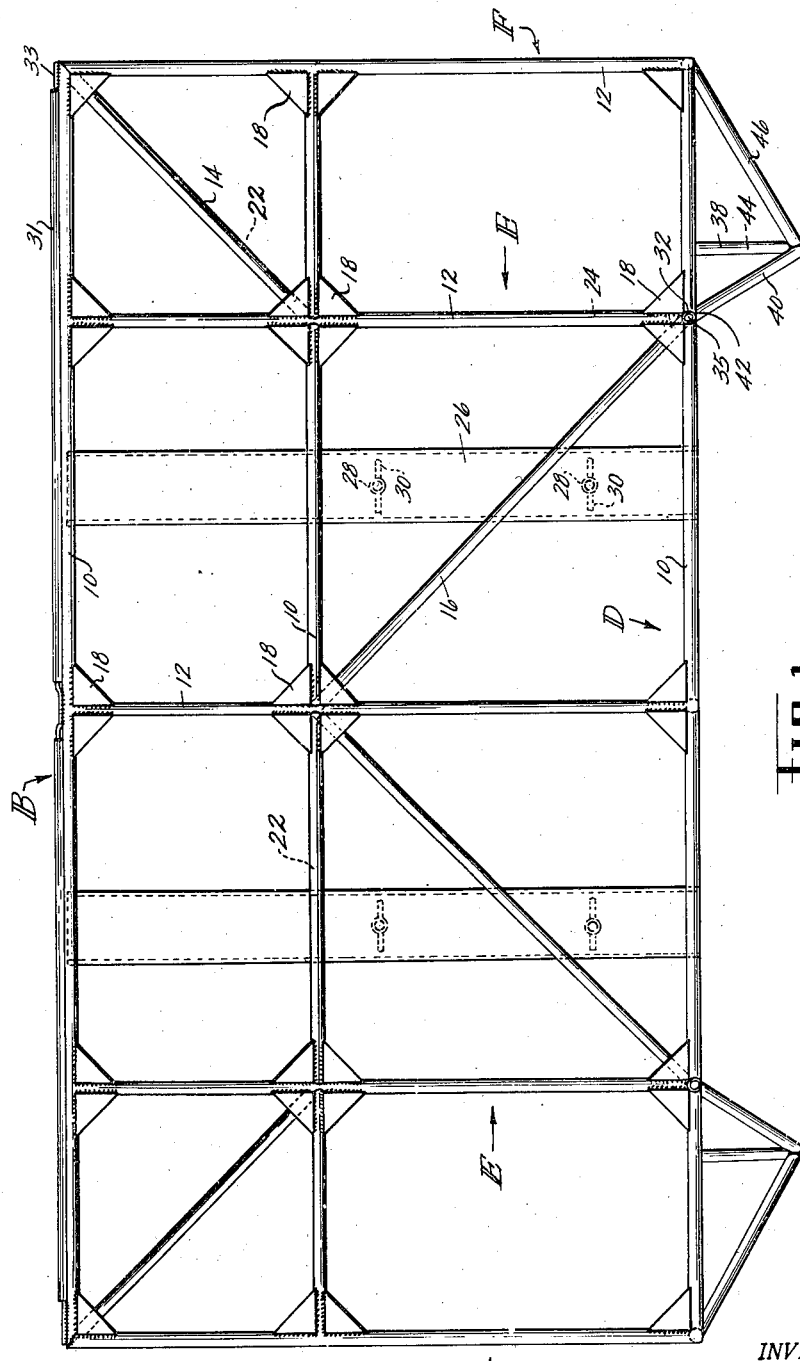

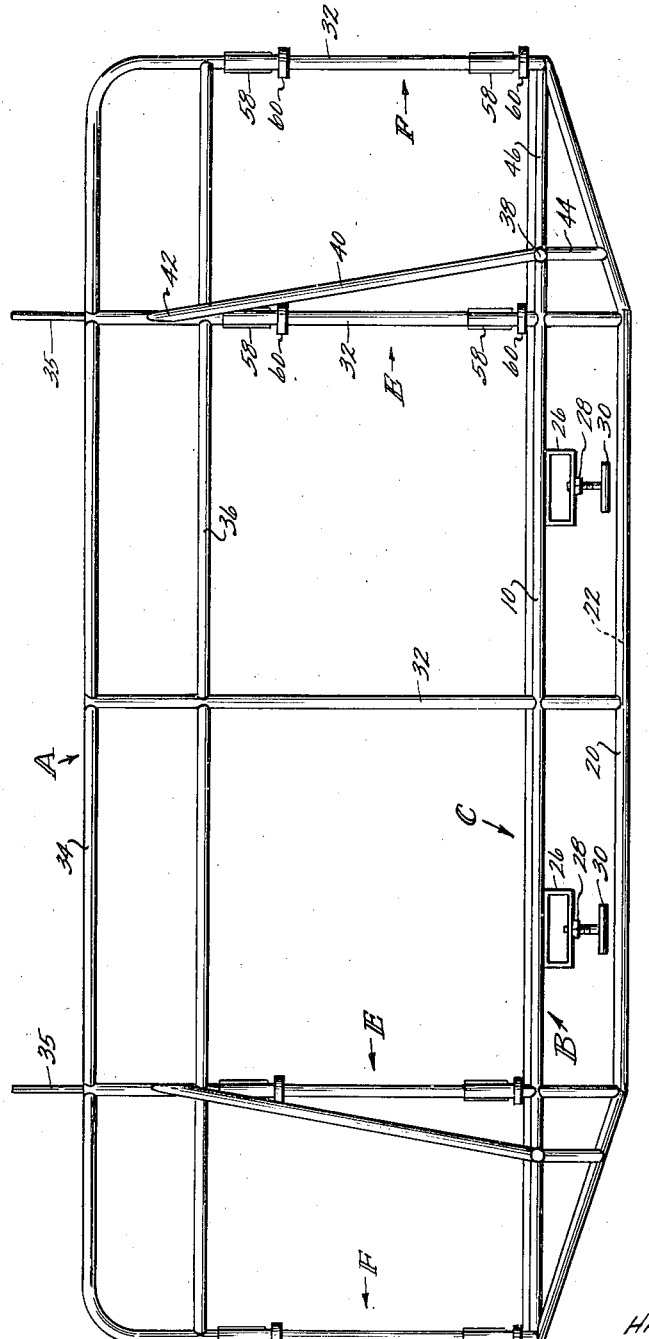

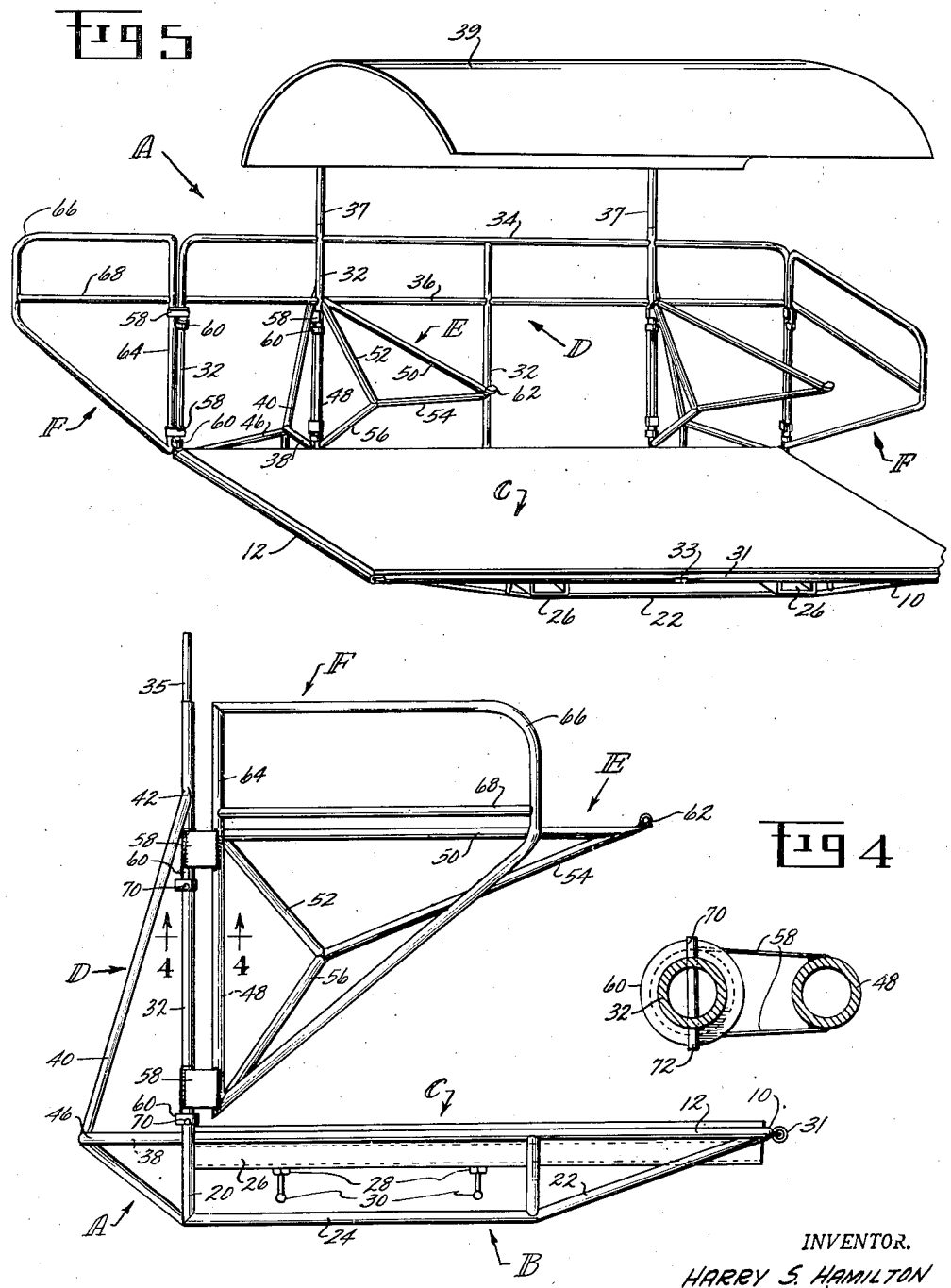

2,462,096

UNITED STATES PATENT OFFICE 2,462,096

LITTER LOADING DEVICE

Harry S. Hamilton, United States Air Forces

Application November 7, 1947, Serial No. 784,640

4 Claims. (Cl. 248—120)

(Granted under the act of March 3, 1883, as amended April 30, 1928; 370 O. G. 757)

The invention described herein may be manufactured and used by or for the Government for governmental purposes without payment to me of any royalty thereon.

This invention relates to litter-loading devices and is particularly adapted for use in connection with a heavy duty large model fork-lift An object of the invention is to provide a device of this kind which is suitable for loading and unloading patients from large aircraft having a considerable ground clearance, preferably as much as or more than ten feet.

Another object is to so construct and arrange the device as to afford maximum safety both for the patients and for the litter bearers.

Other objects and advantages will become evident as the invention is further described with reference to the drawing, wherein, Fig. 1 is a top plan view of the litter loading device with portions removed.

Fig. 2 is a rear view.

Fig. 3 is an end view.

Fig. 4 is a section taken at 4—4 of Fig. 3 showing a combined hinge construction and locking means.

Fig. 5 is a front view of the device in perspective.

Like reference characters refer to like parts throughout the several views of the drawings.

In the drawings, the letter A indicates generally the entire framework which comprises a floor supporting frame B upon which the floor C rests, and a back structure D to which litter-supporting brackets E and end-enclosing gates F are hinged.

The floor supporting frame B is of welded tubular construction and consists of three longitudinal rails 10, five cross rails 12, and diagonal bracing rails 14 and 16, reinforced at the joints by gussets 18. A rear strut 20 extends longitudinally under the rear rail 10 and diagonally up to the rear corners of the frame, and a middle strut 22 extends longitudinally under the middle rail 10 and diagonally to the front corners. Cross braces 24 (see Fig. 3) connect the rear and middle struts. Box girders 26 extend transversely under the frame and are welded thereto. Girders 26 are provided to receive the fork of the conventional fork lift with which the litter loading device of subject invention is to be used. Nuts 28 are welded to the bottom of girders 26 to threadedly receive the locking screws 30 for securing the girders to the fork. Lengths of rubber tubing 31 are threaded on rods 33 which are tack welded to the front rail 10 to form a buffer along the front edge of the frame B. The floor C is preferably made of plywood and completely covers the upper side of the floor supporting structure B. For clearness, Fig. 1 shows the device with the floor removed.

The back D of the framework A, best shown in Fig. 2, consists of a series of five vertical posts 32 welded to and extending upwardly from the rear floor-supporting rail 10, part of the top rail 34 being integral with the two end posts and the remainder being in two pieces fitted between and welded to the three intermediate posts. There is also a medial rail 36 in four parts welded to the posts 32 for connecting the posts together. Short tubes 35 are fitted to the inside of two of the posts 32 and are welded thereto. The posts 37 of a canopy 39 are adapted to slide over the tubes 35 (see Fig. 5) to afford protection against inclement weather.

Bracing for the back D consists of two horizontal pieces 38 extending laterally from the rear floor supporting rail 10, two long diagonal braces 40 extending upwardly from the outer ends of the horizontal pieces 38 to vertical posts 32 to which they are welded as at 42, two shorter diagonal braces 44 extending downwardly from the outer ends of the horizontal pieces 38 to the rear strut 20, and two diagonal braces 46 extending from the outer ends of the horizontal braces 38 to the rear corner posts 32 at the floor line.

The litter-supporting bracket E consists of a vertical hinge post 48, a horizontal litter-supporting rail 50, and three diagonal braces 52, 54, and 56 all welded together as shown in Fig. 3. Plates 58 are welded to the hinge posts 48 and to tubular hinge parts 60 which are freely rotatable on the vertical back posts 32 whereby the litter brackets E may be positioned as shown in Fig. 3 or be swung outwardly and out of the way against the back D. The ends of the tubular parts 50 and 54 are formed into an eyelet as at 62.

The end enclosing gate F comprises a vertical hinge post 64, a frame member 66 and a horizontal brace 68. Hinge plates 58 are welded to hinge posts 64 and to tubular hinge parts 60 which are freely rotatable on back posts 32 whereby the end gate F may swing to open or shut position about the post 32.

The lower ends of the tubular hinge parts 60 both on the brackets E and the gates F are grooved transversely as at 70 (see Figs. 3 and 4), and pins 72, fixed in posts 32 have the ends which project beyond the posts 32 lying in the grooves, whereby the gates and brackets are held by their own weight in their normal position as seen in Fig. 3, but may be swung to an out of the way position by slightly raising the bracket or gate to lift the grooves 70 off the pins.

The operation of the device may be substantially as follows:

The fork of a suitable lifting truck is extended into the box beams 26, and the fastening screws 30 are tightened. The end gates F are both swung to the open position shown at the left end of Fig. 5 and the two litter supporting brackets are swung back out of the way.

Two litters with their patients are now placed side by side on the floor as close to the back as convenient. The litter supporting brackets E are then extended to their operative positions (see Fig. 3), the grooves 70 dropping onto the pins 72 to lock the brackets in the position shown.

Two more litters with their patients are now placed side by side on the brackets E after which the end gates F are closed. The truck lift is then manipulated to raise the device and place the buffer 31 along the lower edge of the access door of a transport plane, which is usually ten feet or more from the ground.

The end gates F are preferably kept closed during the transfer of the litters to the transport plane to prevent the litter bearers stepping off the ends of the floor C. As soon as the two upper litters are removed, the brackets E are swung back out of the way to facilitate removal of the other two litters from the floor. Unloading the patients at a hospital base, is, of course, accomplished in reverse order.

The device has many advantages over conventional practice, and is particularly advantageous in that it may be used to load supplies for transport to the front and wounded at the front for transfer to hospital bases.

Having described an embodiment of the invention,

I claim:

1. A litter loading device which comprises, in combination, a tubular floor supporting frame, a floor fast on said frame, transverse box girders secured to the underside of said floor supporting frame for receiving the fork of a fork lift, locking screws for securing said girders on to said fork, a back structure of welded together tubing extending upwardly from the rear of said floor supporting structure at right angles thereto, bracing between said floor supporting structure and said back structure, a pair of tubular litter supporting brackets hinged to said back structure set in from the ends of said back structure, a pair of end gates hinged to said back structure at the ends thereof, whereby said gates and said brackets may be swung from their normal plane which is at right angles to the plane of said back structure to a plane which is substantially parallel to the plane of the back structure, locking means on said gates and said brackets for retaining them in their normal plane, and a canopy supported on posts extending upwardly from said back structure only.

2. A litter loading device which comprises, in combination, a floor supporting frame, a floor on said frame, transverse girders secured to the underside of said floor supporting frame for receiving the fork of a fork lift, locking means for securing said girders to said fork, a back structure extending upwardly from the rear of said floor supporting structure at right angles thereto, bracing between said floor supporting structure and said back structure, a pair of litter supporting brackets hinged to said back structure set in from the ends of said back structure, a pair of end gates hinged to said back structure at the ends thereof, whereby said gates and said brackets may be swung from their normal plane which is at right angles to the plane of said back structure to a plane which is substantially parallel to the plane of the back structure, locking means on said gates and said brackets for retaining them in their normal plane, and a canopy supported on means extending upwardly from said back structure.

3. A litter loading device which comprises, in combination, a floor supporting frame, a floor on said frame, means carried on the underside of said floor supporting frame for receiving the fork of a fork lift, a back structure extending upwardly from the rear of said floor supporting structure, bracing between said floor supporting structure and said back structure, a pair of litter supporting brackets hinged to said back structure set in from the ends of said back structure, a pair of end gates hinged to said back structure, said gates and said brackets being adapted to be swung from their normal plane which is at right angles to the plane of said back structure to an out of the way position alongside the back structure, means cooperating with said gates and said brackets for removably retaining them in their normal plane, and a canopy removably supported above said floor.

4. A litter loading device which comprises, in combination, a floor, a floor supporting means, adapted on the underside to receive the fork of a fork lift, a back structure extending upwardly from the rear of said floor supporting means, a pair of litter supporting brackets hinged to said back structure set in from the ends of said back structure, and a pair of end gates hinged to said back structure at the ends thereof, said gates and said brackets being adapted to be swung from their normal plane at right angles to the plane of said back structure to an out of the way position along the back structure.

HARRY S. HAMILTON.

REFERENCES CITED

The following references are of record in the file of this patent:

UNITED STATES PATENTS

| Number | Name | Date |
| --- | --- | --- |
| 1,270,383 | Crawford | June 25, 1918 |
| 2,222,570 | Nicou | Nov. 19, 1940 |